UNITED STATES PATENT OFFICE.

EUGENE E. OUDIN, OF NEW YORK, N. Y.

MANUFACTURE OF IMITATION STAINED GLASS.

SPECIFICATION forming part of Letters Patent No. 284,659, dated September 11, 1883.

Application filed August 1, 1883. (No specimens.)

*To all whom it may concern:*

Be it known that I, EUGENE E. OUDIN, a citizen of the United States, and a resident of New York city, in the county of New York and State of New York, have invented certain new and useful Improvements in the Art of Decorating Surfaces and in the Manufacture of Imitation Stained Glass, of which the following is a specification.
My invention has for its object a new and improved composition for use in the manufacture of imitation stained glass, such as that patented by me in United States Letters Patent dated June 12, 1883, No. 279,423, and for other decorative purposes. The varnishes and lacquers named in that patent, when applied to the glass, frequently present a certain flat and cheap appearance, which, excepting in certain effects, does not present an artistic appearance. Moreover, I have found that few varnishes, when flowed in the recesses upon the glass, forming, as it were, little pools, will sufficiently harden, and I have also found that when the glass is turned on edge the varnishes will, though apparently dry, flow or settle in sacks at the lower portion of the recesses, and the lacquers, being mostly colored with aniline colors, will not stand sunlight. An additional advantage flowing from the use of my improvement is its cheapness as a vehicle for holding the coloring-matter, and also the peculiar light-refracting properties possessed by it.

My invention consists in the use of common commercial dextrine, which I dissolve in water and use, either alone or in combination with other substances, as follows: I have found, when the dextrine is dissolved in cold water, in about the proportion of two pounds of the dextrine to about one pint of water, and applied to the glass in the same way that the varnishes are applied thereto in said patent, that upon drying it seems partially to crystallize and presents an effect to some degree resembling cathedral glass, and when the light strikes through it in certain directions the flat, cheap appearance of the varnishes and lacquers heretofore mentioned is avoided, and, moreover, the surface thus treated glistens in a manner similar to frost on a window-pane, and the effect, aside from that of this frost-like glistening, is that it has not quite so much transparency as the varnishes and lacquers, and gives the impression of thickness, strength, and richness, and this effect is obtained, whether there be coloring-matter combined with the dextrine or not. The dextrine dissolved or mixed with the water alone affords a beautiful straw color. To produce the desired colors or tints I mix with the dextrine, dissolved in cold water, as stated, any animal, vegetable, or mineral coloring-matter ground or dissolved in water. I have found that desirable effects can be secured by using the various colored inks found in the market as the coloring material. I do not, however, limit myself to colors prepared in water, for any oil preparations, being suitably treated so that they will properly combine with the dissolved dextrine, may be used. When the dextrine thus prepared is dry or almost dry upon the glass, I apply a heavy coat of "Crocket's Preservative" or other equivalent varnish to the dextrine, which permeates the dextrine and penetrates to the glass, and this preservative or varnish, when dried, causes the dextrine to adhere firmly to the glass, and also solidifies, binds together, and protects the same. I have also discovered that when the dextrine is dissolved in hot water, preferably by boiling therein, there is no crystallization upon drying, and when used without other coloring-matter it affords a very superior amber color. The effect, when thus dissolved in hot water, is to produce a substance which takes the delicate shades and tints of the coloring-matter combined with it better than varnishes, lacquers, &c., and possesses a certain clearness, brilliancy, and transparency, which, nevertheless, has not the flat, cheap appearance of the varnishes and lacquers, and which, furthermore, dries to great toughness and hardness. This brilliant and transparent effect, which is yet not flat or cheap in appearance, is frequently very useful, because in certain designs a brilliant line will define an outline with better effect than a line of different color. The same protecting and binding coat of varnish or Crocket's Preservative should likewise be used after this preparation of the dextrine has been applied to the glass. I have also discovered that when the dextrine, dissolved either in cold or hot water, is mixed with common commercial glycerine, the effect is to make the resultant compound exceedingly adhesive to the glass, and very tough and elastic, and at the same time the color-taking properties of the mass are not impaired. Thus, with glass which is intended to be used in a door or other place where the plate of glass may be sprung or bent by the sudden pulling open or binding of the door, and where also the glass will be subjected to jar and shock, all of which tends to separate the dextrine from the glass, the glycerine should or may be advantageously used. I preferably, although not necessarily, apply the before-mentioned protecting and binding coat of varnish after the use of this preparation of the dextrine and glycerine also. Instead of the glycerine, and as an equivalent for it, I have used for this purpose common refined or crystallized sugar, in the proportion of about fifteen lumps of the sugar (known in the market as "cut sugar") to about three quarts of the dissolved dextrine; also, the glycerine may be combined with the sugar to effect the same result. I have also found that by adding foreign substances to the dextrine compounds before mentioned, either before their application to the glass or afterward, but before they have hardened, many desirable effects—such as solidity, brilliancy, &c.; in fact, many, if not all, the effects obtained in the genuine stained glass, and some not there attainable—are secured. There is a great variety of substances which may be advantageously used in this way—such, for example only, as broken glass, sand, pebbles, hair, and drops of oil—and in their application they will be embedded in and held by the dextrine and external protecting-coat of varnish or Crockett's Preservative, if the same be used.

I do not limit myself in the use of this invention to making stained glass, either that mentioned in my said patent or any other. It is my intention to use it for decorative purposes generally, irrespective of translucency or transparency of the surface to which it may be applied—as, for example only, I apply it to the handles of brushes, to picture-frames, to pottery, for ornamenting panels, &c. It hardens and firmly adheres to almost all substances when treated as hereinbefore described. I also desire to state that in combining the coloring-matter with the dextrine the color or colors may be only partially mixed with the dextrine, thus producing a vari-colored, streaked, spotted, or "marbleized" appearance.

Having thus described my invention, I claim—

1. The described process of manufacturing imitation stained glass, consisting in dissolving dextrine in water, hot or cold, and with or without coloring-matter, and applying the same to the glass and allowing it to harden thereon, and applying thereto a coat of protecting and binding material.

2. As a new article of manufacture, imitation stained glass in which dextrine, with or without coloring-matter, is caused to adhere to the glass, substantially as and for the purposes set forth.

3. The described process of manufacturing imitation stained glass, consisting in dissolving dextrine in water, hot or cold, and with or without coloring-matter, then mixing with the dextrine foreign substances, and then applying the resulting compound to the surface of the glass, allowing the same to harden thereon, and then applying thereto a coat of protecting and binding material.

4. The described process of manufacturing imitation stained glass, consisting in dissolving dextrine in water, hot or cold, and with or without coloring-matter, then applying the dextrine thus prepared to the surface of the glass, and adding to it, before it hardens, foreign substances, then allowing the dextrine to harden upon the glass, and then applying to the dextrine a coat of protecting and binding material.

5. As a new article of manufacture, imitation stained glass, to the surface of which the color-bearing material is applied, which has embedded in it undissolved particles of foreign substances, substantially as and for the purposes set forth.

6. The described process of manufacturing stained glass, consisting in dissolving dextrine in water, hot or cold, and with or without coloring-matter, combining glycerine with the dextrine, substantially as described, and applying the resulting compound to the glass, and allowing it to adhere thereto.

7. As a new article of manufacture, dissolved dextrine mixed with coloring substances, substantially as and for the purposes set forth.

Signed at New York city, in the county of New York and State of New York, this 31st day of July, A. D. 1883.

EUGENE E. OUDIN.

Witnesses:
PHILLIPS ABBOTT,
WALTER H. CRITTENDEN.